UNITED STATES PATENT OFFICE.

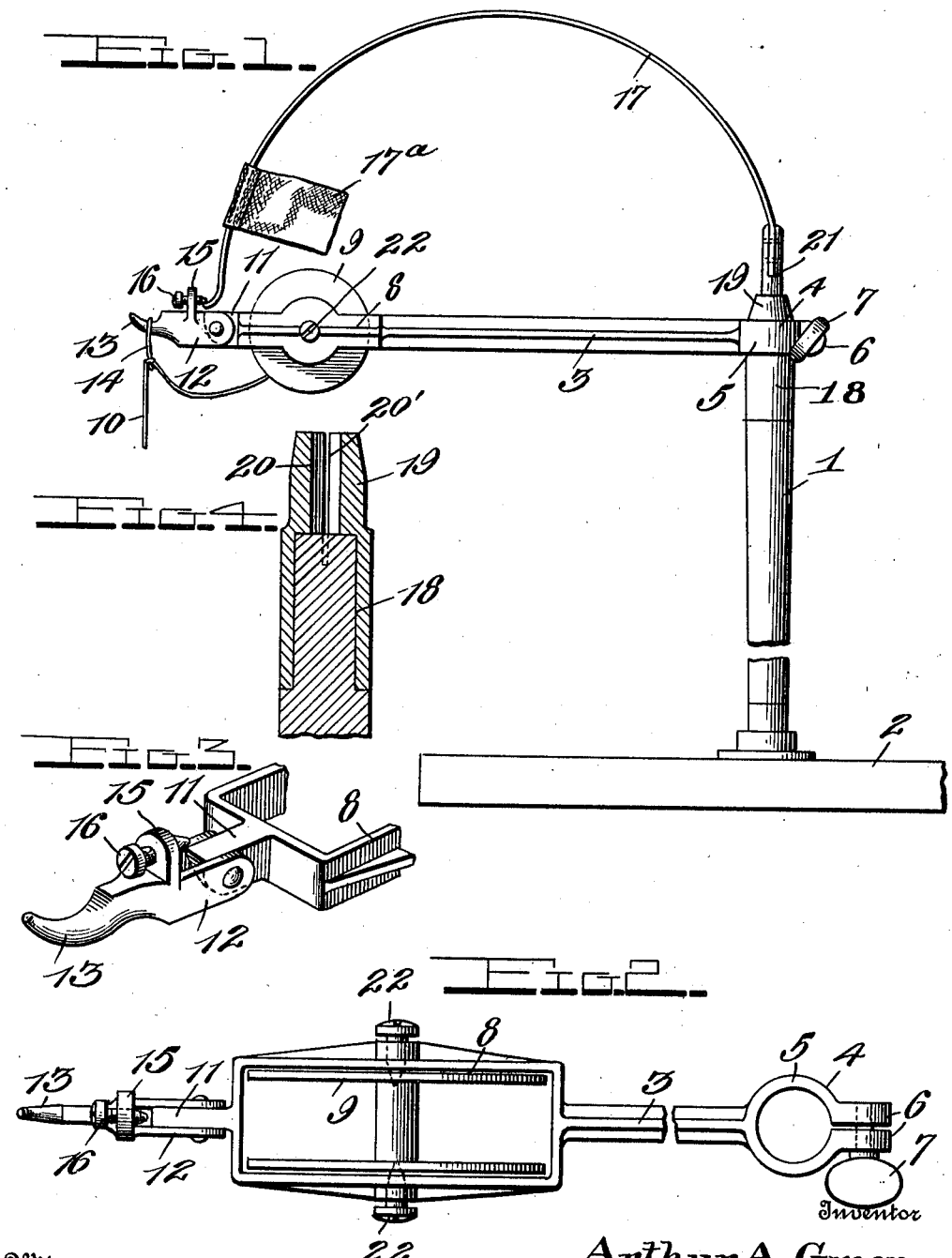

ARTHUR A. GREEN, OF SCHENECTADY, NEW YORK.

AUTOMATIC FISHING-POLE.

1,021,147. Specification of Letters Patent. Patented Mar. 26, 1912.

Application filed March 1, 1911. Serial No. 611,588.

*To all whom it may concern:*

Be it known that I, ARTHUR A. GREEN, a citizen of the United States, residing at Schenectady, in the county of Schenectady and State of New York, have invented certain new and useful Improvements in Automatic Fishing-Poles, of which the following is a specification, reference being had to the accompanying drawings.

My invention relates to new and useful improvements in fishing devices, and more particularly to devices for fishing through ice in winter months, and my object is to provide a fishing device of this character with means thereon for automatically indicating when a bite has been obtained.

A further object is to provide a rod having a reel and line wound thereon.

A still further object is to provide a bow spring having a signal thereon, which is operated by the drawing of the line.

A still further object is to provide a tripping mechanism adapted to hold the spring in bowed position, and having engagement with a portion of the line, whereby when the line is pulled said spring will be released.

A still further object is to provide a rod adapted for adjustment to any form of standard.

A still further object is to provide a device of this character which is simple in construction, inexpensive to manufacture, and efficient in operation.

With these and other objects in view, my invention consists in the novel features of construction, combination and arrangement of parts as will be hereinafter referred to and more particularly pointed out in the specification and claims.

In the accompanying drawing, forming a part of this application, Figure 1 is a side elevation of my device complete, set for operation; Fig. 2 is a top plan view of the device with the spring removed; Fig. 3 is a detail perspective view of the setting member; and Fig. 4 is a fragmentary longitudinal section through one end of the standard.

In carrying out my invention, I shall refer to the drawing in which similar reference characters designate corresponding parts throughout the several views, and in which 1 indicates a standard or pole of any preferred form, but substantially circular in cross-section, having the lower end thereof tapered, which is adapted to be wedged in a hole drilled in the ice, or mounted, in any preferred manner, on a wood base 2, so that the same may be adapted to float on water, when used during the warmer months. A rod 3 cast from any desired material, is adapted to be mounted upon the upper end of said standard by means of a clamp 4, which clamp is provided with arcuately designed arms 5, from which extend lateral flanges 6. A winged nut 7, in engagement with the flanges 6, when turned properly is adapted to force the arms of the clamp toward one another, and it will be seen that when said clamp is properly positioned upon the upper end of said standard, and the arms thereof brought into engagement with the same, the rod 3 will be extended horizontally at substantially right angles to the standard 1. The rod adjacent its outer end is enlarged, as at 8, and slotted to receive a reel 9, which is removably mounted therein, said reel having wrapped therearound the usual, or any preferred form of line 10.

From the outer end of the reel-receiving portion of the rod 3, extends a shank 11, and a setting member 12, having one end thereof bifurcated to receive said shank 11, is pivoted thereto. The setting member 12 is provided at its outer end with a hook or the like 13, with which is engaged a loop 14 in the line 10, this end of the line being provided with the customary hook, sinker and float. As the setting member is pivotally mounted at the end of the rod and the loop 14 of the line 10 engaged therewith, it will doubtless be appreciated that a pull upon the extended portion of the line will draw said setting member downwardly. The setting member 12 is also provided with an upwardly extending shank 15 through which extends a threaded adjusting screw 16, said screw being adapted to receive thereunder the free end of a leaf or bow spring 17, so that any downward movement of said setting member will allow said spring to be released from its bowed position. The spring 17 carries adjacent its free end the signal 17ª, preferably a flag, and as the adjusting screw 16 is set so as to engage merely a small portion of the free end of the spring, any slight nibble at the extended end of the line 10 will be sufficient to trip the setting member, and thereby release the spring. Upon the tripping of the setting member by a bite at the extended end of the line, the loop 14 slips from the hook 13 and the fish is given a free line to swim away as far as the line on the reel will permit, but in the meantime, the fisherman, a short distance away, will be notified by the flag signal on the spring, whereupon he may go to the line and draw in the bite.

As stated, the bite is allowed to carry a line the full extent thereof on the reel, but said reel may be allowed to revolve easily, or otherwise, according to the adjustment of the screws 22.

The spring is mounted upon the outer end of the standard 1, and to receive the same, I provide the upper end of said standard with a ferrule 18, having an extension 19 thereon, which extension is provided with a socket 20 and slotted as at 20'. A connecting member 21 carrying the spring 17 is adapted to enter the socket 20 of the ferrule, whereby said spring may be quickly and easily mounted upon said standard in setting up the device.

This device is particularly adapted for use during the winter months, whereby any number of these devices may be placed upon the ice, according to the State laws, and the lines thereof extended through holes in the ice, thereby eliminating the necessity of a fisherman remaining in the open. This device, however, is further adapted for use in regular fishing seasons, and as I provide a wood base, the same may be floated in a stream or body of water in which the fishing is to be accomplished.

From the foregoing it will be seen that I have provided a device for fishing through ice, and it will still further be seen that the device is provided with means for indicating when a bite has been obtained.

It will still further be seen that by providing a setting member to engage a loop in the line, the extended portion of said line will be prevented from resting upon the ice and from becoming frozen thereto.

It will still further be seen that by providing a setting member having an adjusting screw thereon, the spring may be set accordingly.

It will still further be seen that my device is simple in construction, is extremely efficient in operation and inexpensive to manufacture.

What I claim is:

1. A fishing device of the character described, comprising a rod, a supporting means therefor, a reel revolubly mounted on said rod, a line carried by said reel having a portion extended therefrom, a pivoted member on said rod adapted to have engagement with the extended portion of said line, a leaf spring having one end thereof mounted in said supporting means and carrying a signaling means, and an adjusting screw carried by said pivoted member adapted to receive in engagement the free end of said spring, whereby when said pivoted member has been tripped, said spring will be released to indicate the same.

2. A fishing device of the class described, comprising a rod having a portion thereof enlarged and slotted, a reel rotatably mounted in said slotted portion, a shank formed on said rod beyond the enlarged portion thereof, a setting member bifurcated to receive said shank and pivoted thereto, supporting means for said rod, a spring member having one end thereof secured to said supporting means and carrying a signal thereon, means on the setting member adapted to engage the free end of said spring member, and a line on said reel engaged with said setting member.

3. A device of the class described, comprising a standard, a rod removably engaged therewith, said rod having a reel rotatably mounted thereon adjacent its free end, a shank formed on said rod beyond the reel, a setting member bifurcated to receive said shank and pivoted thereto, said setting member being also provided with an adjusting screw, a leaf spring having one end thereof engaged with said standard and carrying a signal, the free end of said spring being adapted for engagement with the adjusting screw of said setting member, and a line carried on said reel and engaged with said setting member.

4. A device of the class described, comprising a rod, supporting means therefor, said rod being enlarged adjacent one end thereof and slotted, a reel pivotally mounted in said slotted portion, a shank formed on the rod beyond said slotted portion, a setting member bifurcated to receive said shank and pivoted thereto, said setting member being also provided with an upstanding lug, an adjusting screw carried in said lug, a leaf spring having one end thereof engaged with said supporting means and carrying a signal, the free end of said leaf spring being adapted for engagement with the free end of said adjusting screw, and a line carried on the reel adapted to be engaged with said setting member.

In testimony whereof I hereunto affix my signature in the presence of two witnesses.

ARTHUR A. GREEN.

Witnesses:
 MAURICE B. FLEEDE,
 J. LESLIE SCHOOLCRAFT.

---

Copies of this patent may be obtained for five cents each, by addressing the "Commissioner of Patents, Washington, D. C."